(12) United States Patent
Childress

(10) Patent No.: US 10,994,760 B2
(45) Date of Patent: May 4, 2021

(54) CART APPARATUS AND METHODS FOR USE

(71) Applicant: The Boeing Company, Chicago, IL (US)

(72) Inventor: Jamie J. Childress, Seattle, WA (US)

(73) Assignee: The Boeing Company, Chicago, IL (US)

(*) Notice: Subject to any disclaimer, the term of this patent is extended or adjusted under 35 U.S.C. 154(b) by 276 days.

(21) Appl. No.: 15/985,316

(22) Filed: May 21, 2018

(65) Prior Publication Data

US 2018/0265111 A1    Sep. 20, 2018

Related U.S. Application Data

(63) Continuation of application No. 14/944,534, filed on Nov. 18, 2015, now Pat. No. 10,005,482.

(51) Int. Cl.
| | | |
|---|---|---|
| *B62B 3/00* | (2006.01) | |
| *B62B 3/10* | (2006.01) | |
| *B62B 5/00* | (2006.01) | |
| *B64D 11/00* | (2006.01) | |
| *B65F 3/00* | (2006.01) | |

(52) U.S. Cl.
CPC .............. *B62B 3/005* (2013.01); *B62B 3/004* (2013.01); *B62B 3/006* (2013.01); *B62B 3/108* (2013.01); *B62B 5/0003* (2013.01); *B64D 11/0007* (2013.01); *B65F 3/005* (2013.01); *B62B 2204/06* (2013.01)

(58) Field of Classification Search
CPC ......... B62B 3/005; B62B 3/006; B62B 3/004; B62B 3/108; B62B 2204/06; B64D 11/0007

USPC ..................................................... 220/495.08
See application file for complete search history.

(56) References Cited

U.S. PATENT DOCUMENTS 2,534,169 A * 12/1950 Hope ..................... A47F 1/065
                                                           221/279
D202,493 S    10/1965 Gribbens
D238,300 S    12/1975 Klemm
(Continued)

FOREIGN PATENT DOCUMENTS

| FR | 2877551 A1 | 5/2006 |
| WO | 2007149468 A2 | 12/2007 |
| WO | 2012030881 A1 | 3/2012 |

OTHER PUBLICATIONS

European Patent Office, Extended European Search Report dated Mar. 29, 2017, issued in connection with EP Application No. 16180962.9, 8 pages.

*Primary Examiner* — Ernesto A Grano
(74) *Attorney, Agent, or Firm* — McDonnell Boehnen Hulbert & Berghoff LLP

(57) ABSTRACT

An apparatus and methods for a convertible service and recycling cart for food and beverage service and waste sorting, compaction and storage are disclosed. An example cart apparatus includes a base, a first sidewall and a second sidewall each coupled to the base and a top support coupled to the first sidewall and the second sidewall. At least one opening is defined in the top support and a lid is removably coupled to the top support. The apparatus also includes at least one container that is configured to be removably coupled to the at least one opening in the top support.

20 Claims, 8 Drawing Sheets

(56) References Cited

U.S. PATENT DOCUMENTS

| | | | | |
|---|---|---|---|---|
| 4,114,965 | A * | 9/1978 | Oye | A47B 31/00 |
| | | | | 312/209 |
| 5,001,977 | A * | 3/1991 | Tracy | B30B 1/006 |
| | | | | 100/102 |
| 5,096,086 | A | 3/1992 | Crema | |
| D327,760 | S * | 7/1992 | Donnelly | D34/1 |
| 5,174,468 | A | 12/1992 | Holderman | |
| 5,238,139 | A | 8/1993 | Bisceglia | |
| 5,404,999 | A * | 4/1995 | Bednar | A01K 1/0107 |
| | | | | 206/204 |
| 5,611,270 | A * | 3/1997 | Harrington | B30B 9/323 |
| | | | | 100/102 |
| 5,626,353 | A * | 5/1997 | Campbell | A47B 31/02 |
| | | | | 280/47.35 |
| 5,873,643 | A | 2/1999 | Burgess, Jr. | |
| 6,000,323 | A | 12/1999 | Schlegel | |
| 6,000,486 | A * | 12/1999 | Romick | B62B 3/008 |
| | | | | 180/209 |
| 6,034,355 | A | 3/2000 | Naderi et al. | |
| 6,102,219 | A | 8/2000 | Wang | |
| 6,234,498 | B1 | 5/2001 | Saku et al. | |
| 7,204,407 | B2 | 4/2007 | Laher | |
| 7,273,155 | B1 * | 9/2007 | Gray | B65F 1/065 |
| | | | | 220/495.04 |
| 7,401,708 | B2 * | 7/2008 | Lin | B65F 1/06 |
| | | | | 220/23.87 |
| D647,272 | S | 10/2011 | Boivin et al. | |
| 8,550,284 | B1 | 10/2013 | Morad et al. | |
| 8,696,028 | B2 * | 4/2014 | Nelson | A47L 13/50 |
| | | | | 280/47.34 |
| 8,840,122 | B1 | 9/2014 | Cummins | |
| 8,944,274 | B2 | 2/2015 | Madrid | |
| 9,809,239 | B1 * | 11/2017 | Reiss | B65F 1/1473 |
| D821,675 | S | 6/2018 | Burns et al. | |
| D822,932 | S | 7/2018 | Burns et al. | |
| 10,273,006 | B2 * | 4/2019 | Reiss | B30B 1/12 |
| 10,427,791 | B2 * | 10/2019 | Beets | B64D 11/0007 |
| 10,518,794 | B2 * | 12/2019 | Jackson | B62B 3/10 |
| 2002/0182102 | A1 * | 12/2002 | Fontenot | A61F 13/551 |
| | | | | 422/5 |
| 2004/0217238 | A1 | 11/2004 | Cochinov et al. | |
| 2005/0193760 | A1 | 9/2005 | Moran et al. | |
| 2005/0218615 | A1 | 10/2005 | Hu | |
| 2005/0285360 | A1 | 12/2005 | Helin et al. | |
| 2006/0055290 | A1 | 3/2006 | Schalla | |
| 2007/0151308 | A1 | 7/2007 | Eisin | |
| 2008/0116773 | A1 | 5/2008 | Van Loon et al. | |
| 2008/0247680 | A1 * | 10/2008 | Wallace | B65F 1/068 |
| | | | | 383/33 |
| 2010/0090429 | A1 | 4/2010 | Hartmann et al. | |
| 2010/0140890 | A1 | 6/2010 | Boivin et al. | |
| 2010/0170287 | A1 | 7/2010 | Böss | |
| 2011/0025006 | A1 | 2/2011 | Knoppers | |
| 2013/0270988 | A1 * | 10/2013 | Nicholson | A47B 96/00 |
| | | | | 312/400 |
| 2014/0021690 | A1 | 1/2014 | Burd | |
| 2015/0091421 | A1 | 4/2015 | Van Loon | |
| 2015/0108888 | A1 | 4/2015 | Galimberti | |
| 2015/0251758 | A1 | 9/2015 | Vandyke et al. | |
| 2017/0137048 | A1 | 5/2017 | Childress | |
| 2019/0062047 | A1 | 2/2019 | Spille et al. | |

* cited by examiner

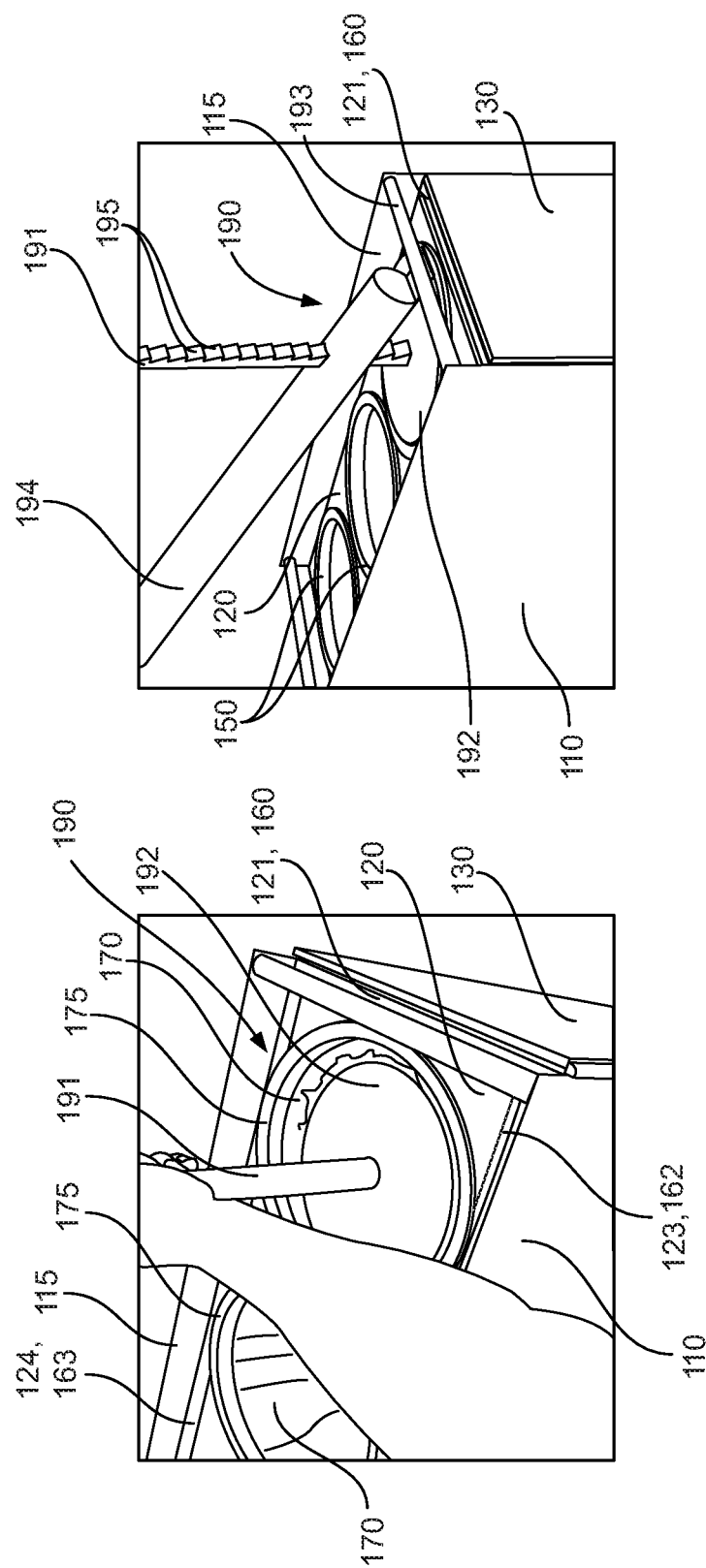

CART APPARATUS AND METHODS FOR USE

CROSS-REFERENCE TO RELATED APPLICATION

This application claims the benefit of the filing date of U.S. Non-Provisional patent application Ser. No. 14/944,534, filed Nov. 18, 2015, which is hereby incorporated by reference in its entirety.

FIELD

The disclosure is related to a beverage cart and, more particularly, to a convertible service and recycling cart for food and beverage service and waste collection, sorting, compaction and storage.

BACKGROUND

Known service carts for passenger flights on commercial aircraft permit storage and dissemination of beverages and food to passengers. After food and beverage service is complete, flight attendants typically collect trash from passengers by walking down the aisle carrying a trash bag in their hand and collect either garbage or recycling. Generally, minimal sorting of trash occurs for recycling purposes and the flight attendant only has one free hand to assist passengers. In addition, the trash may often include containers partially filled with liquid. This liquid may pool at the bottom of trash bags. If a trash bag then becomes punctured, liquid may leak onto the cabin floor and galley, for example. In view of the potential for leakage, trash collected onboard a flight is generally not compacted within the trash bags themselves in order to avoid puncturing the bag.

SUMMARY

In a first aspect, an apparatus is provided that includes a base, a first sidewall and a second sidewall each coupled to the base and a top support coupled to the first sidewall and the second sidewall. At least one opening is defined in the top support and a lid is removably coupled to the top support. The apparatus also includes at least one container that is configured to be removably coupled to the at least one opening in the top support.

A second aspect is directed to a method for a cart apparatus that includes (a) a base, (b) a first sidewall and a second sidewall each coupled to the base, (c) the top support coupled to the first sidewall and the second sidewall, (d) at least one opening defined in the top support, (e) the lid removably coupled to the top support and (f) at least one container configured to be removably coupled to the at least one opening in the top support. The method includes removing a lid from a top support of a cart apparatus. The method also includes inserting the at least one container into the at least one opening in the top support and inserting at least one bag into the at least one container disposed through the top support. And the method includes securing an open end of the at least one bag to the first end the at least one container via at least one locking ring.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

Presently preferred embodiments are described below in conjunction with the appended figures, wherein like reference numerals refer to like elements in the various figures, and wherein:

FIG. 9 is a diagrammatic representation of a perspective view of a cart apparatus, according to the embodiment of FIG. 1, in a waste collection configuration with a compactor in place;

FIG. 10 is a diagrammatic representation of a perspective view of a cart apparatus, according to the embodiment of FIG. 1, in a waste collection configuration with a second embodiment of a compactor in place;

Corresponding parts are marked with the same reference symbols in all figures.

Figure 2:
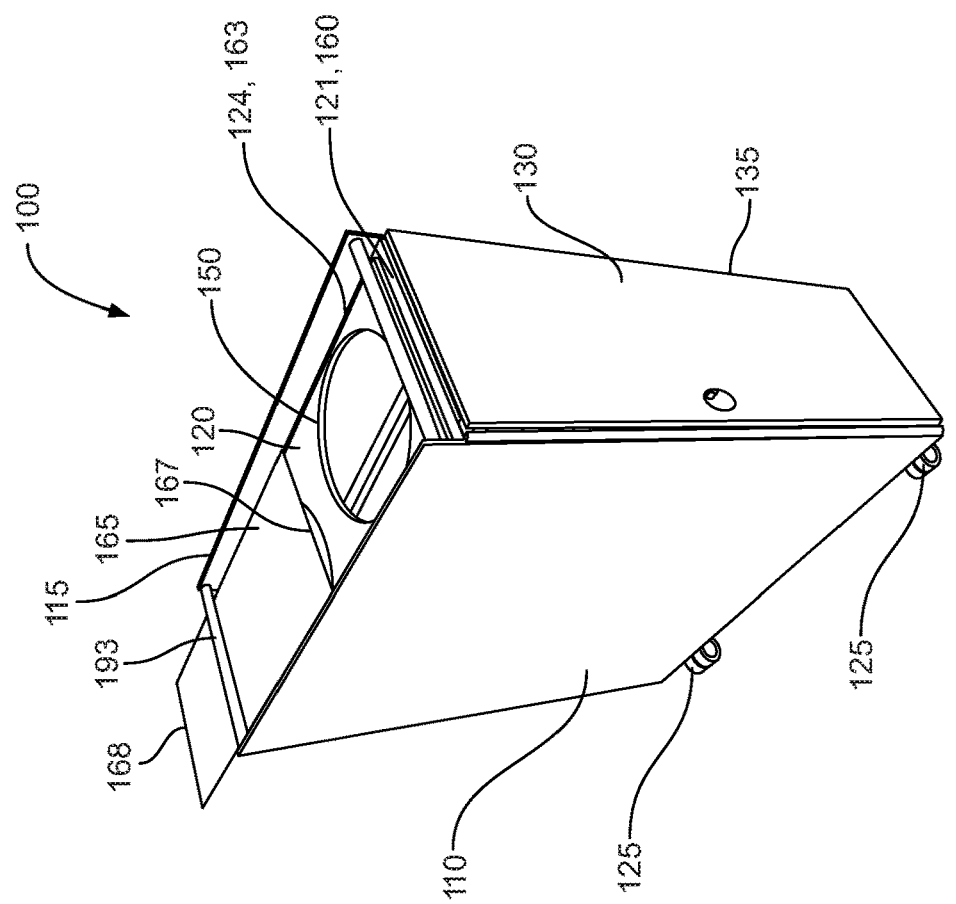
FIG. 2 is a diagrammatic representation of a perspective view of a cart apparatus, according to the embodiment of FIG. 1, transitioning from the service configuration to a waste collection configuration.

The drawings are provided for the purpose of illustrating example embodiments, but it is understood that the inventions are not limited to the arrangements and instrumentalities shown in the drawings.

DETAILED DESCRIPTION

The disclosed embodiments provide a convertible service and recycling cart for food and beverage service and waste collection, sorting, compaction and storage and methods for use thereof. The advantages of the embodiments in the present disclosure may include, but are not limited to, permitting sorting of trash for recycling, allowing waste to be compacted within bags thereby increasing trash storage space, preventing leakage from trash bags via a liquid absorber, reducing airline cabin cleaning time, reducing costs and further waste by avoiding double bagging trash bags containing liquid, permitting trash to be stored within the cart thereby reducing required space for trash storage, especially on long flights.

Figure 1:
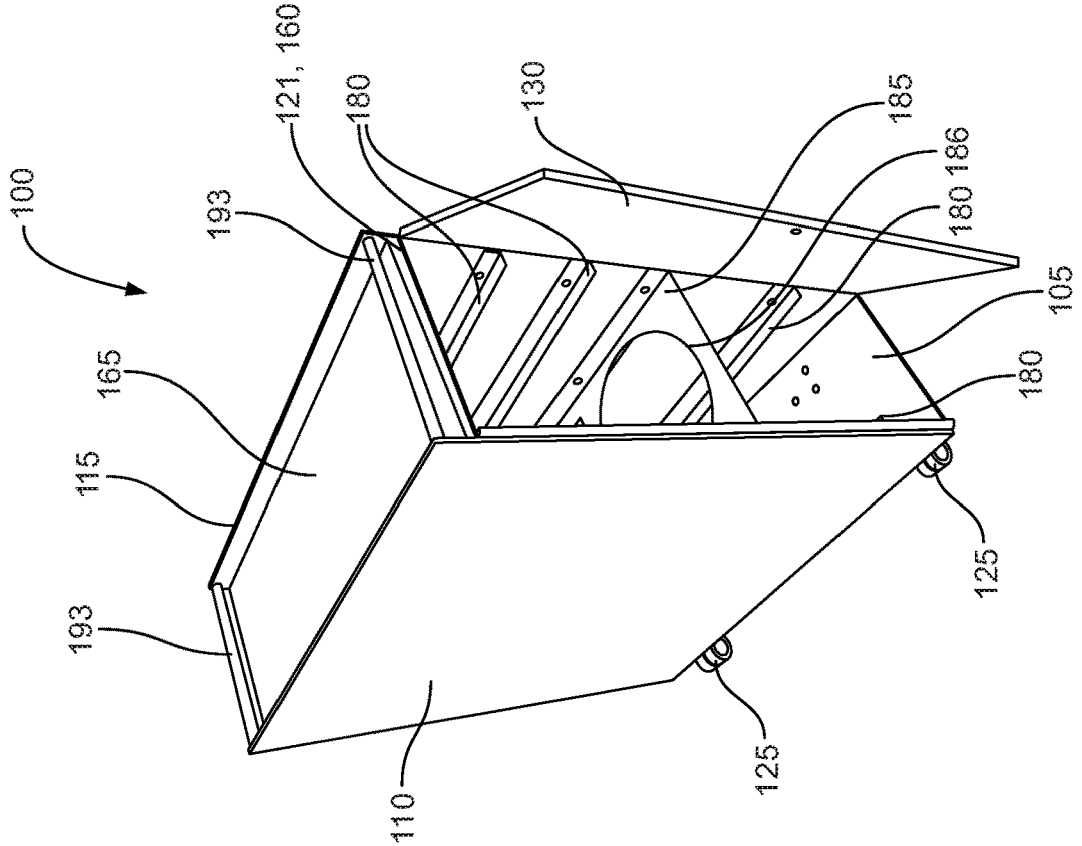
FIG. 1 is a diagrammatic representation of a perspective view of a cart apparatus, according to one example embodiment, in a service configuration.
Figure 7:
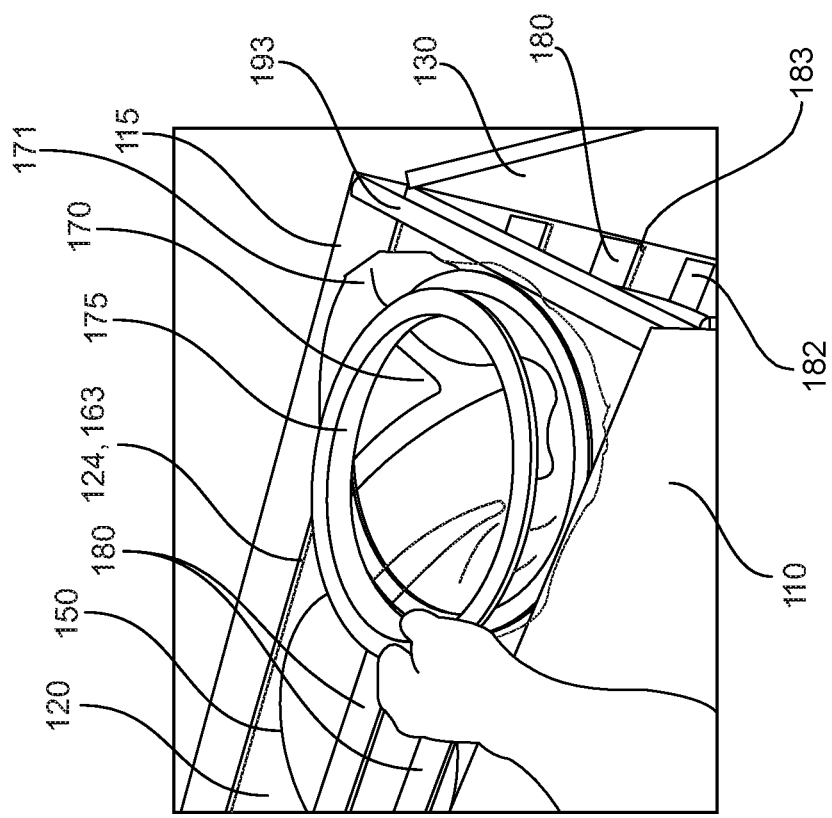
FIG. 7 is a diagrammatic representation of a perspective view of a cart apparatus, according to the embodiment of FIG. 1, transitioning from the service configuration to the waste collection configuration.
Figure 8:
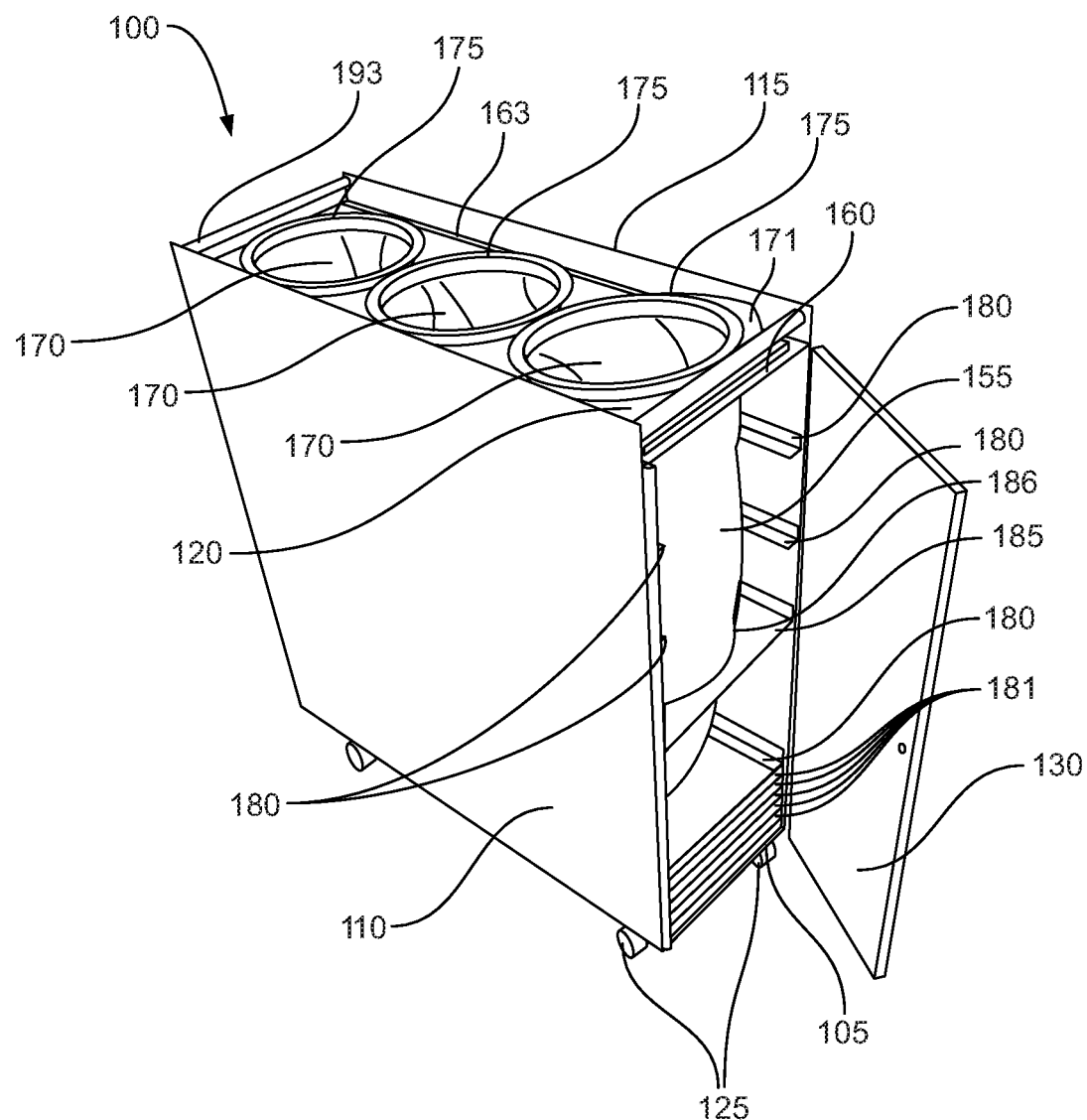
FIG. 8 is a diagrammatic representation of a perspective view of a cart apparatus, according to the embodiment of FIG. 1, in the waste collection configuration.

A cart apparatus 100 is provided that may be convertible from a service configuration to distribute food and beverages to passengers, shown in FIG. 1, to a waste collection configuration to collect, sort, compact, and/or store waste, shown in FIG. 8. The cart apparatus 100 is further shown in FIGS. 2-7 in various stages of the conversion process between the service configuration and the waste collection configuration.

FIGS. 1 and 2 depict the cart apparatus 100 having a base 105, a first sidewall 110, and a second sidewall 115 each coupled to the base 105. The cart apparatus 100 further includes a top support 120 coupled to the first sidewall 110 and the second sidewall 115. In one embodiment, the cart apparatus 100 may include a plurality of wheels, rollers or casters 125 coupled to the base 105 that may facilitate movement of the cart apparatus 100. The cart apparatus 100 may optionally include a first door panel 130 coupled to a first end 135 of one of the first sidewall 110 or the second sidewall 115 and/or a second door panel 140 coupled to a second end 145 of one of the first sidewall 110 or the second side wall 115. The first and second door panels 130, 140 may prevent the contents of the cart apparatus 100 from inadvertently exiting the cart apparatus 100.

Figure 3:
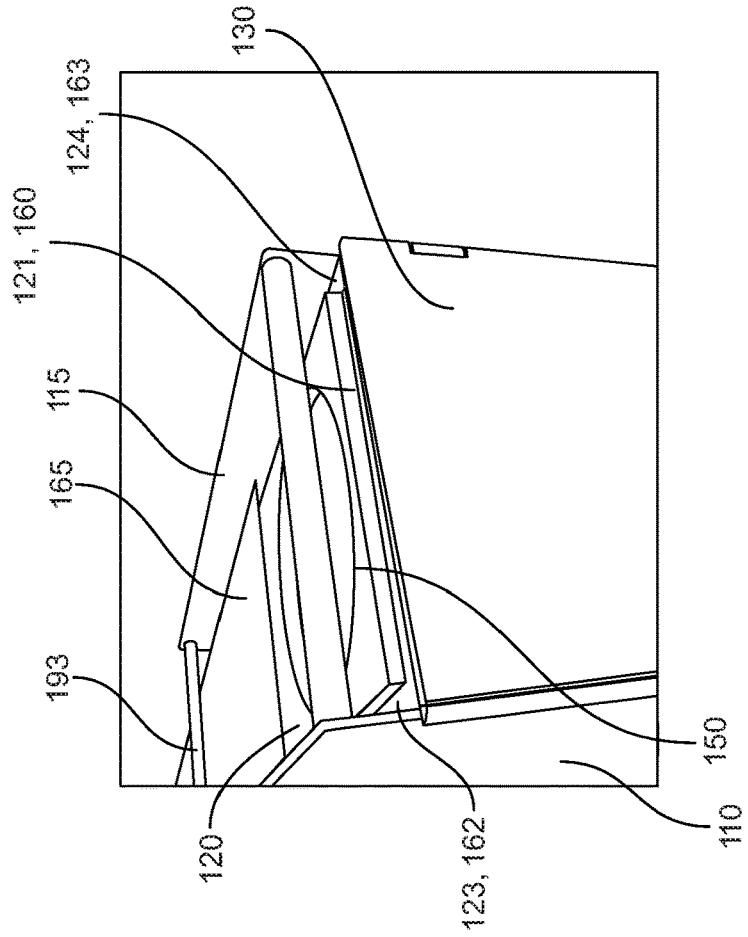
FIG. 3 is a diagrammatic representation of a partial perspective view of a cart apparatus, according to the embodiment of FIG. 1, transitioning from the service configuration to the waste collection configuration.
Figure 5:
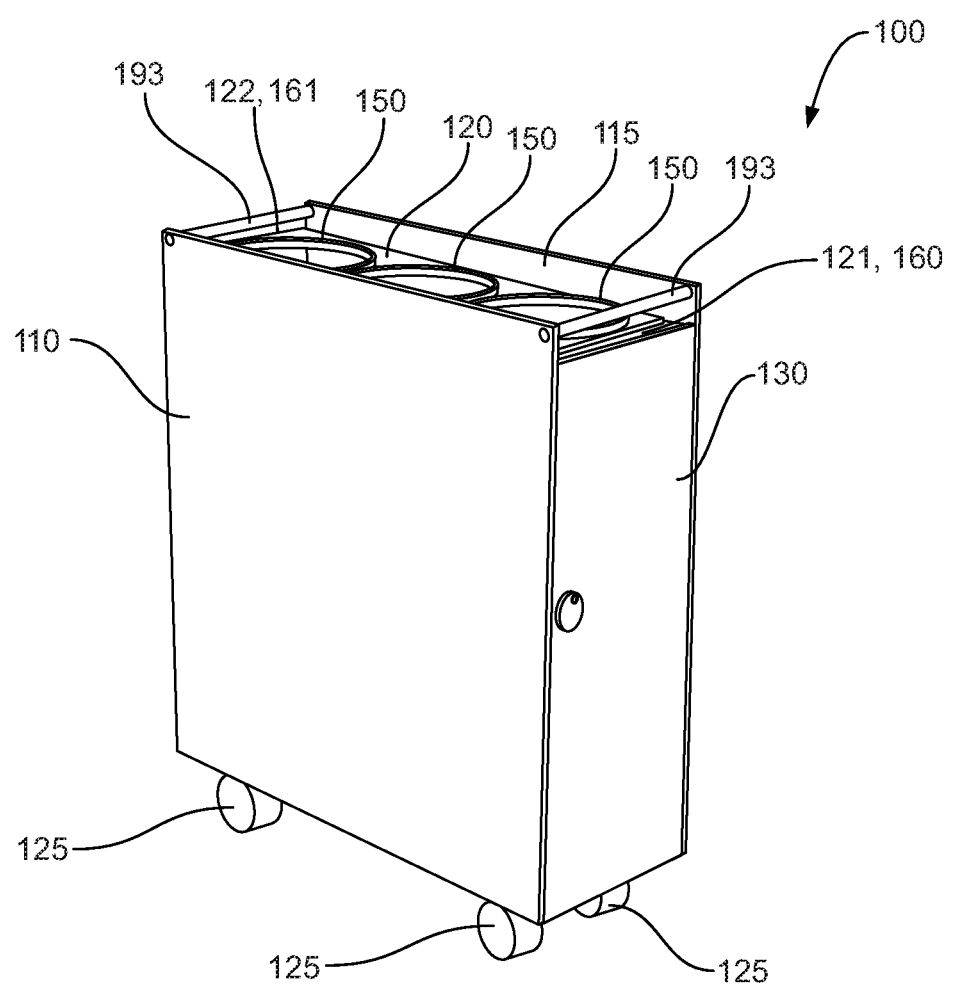
FIG. 5 is a diagrammatic representation of a perspective view of a cart apparatus, according to the embodiment of FIG. 1, transitioning from the service configuration to the waste collection configuration.
Figure 6:
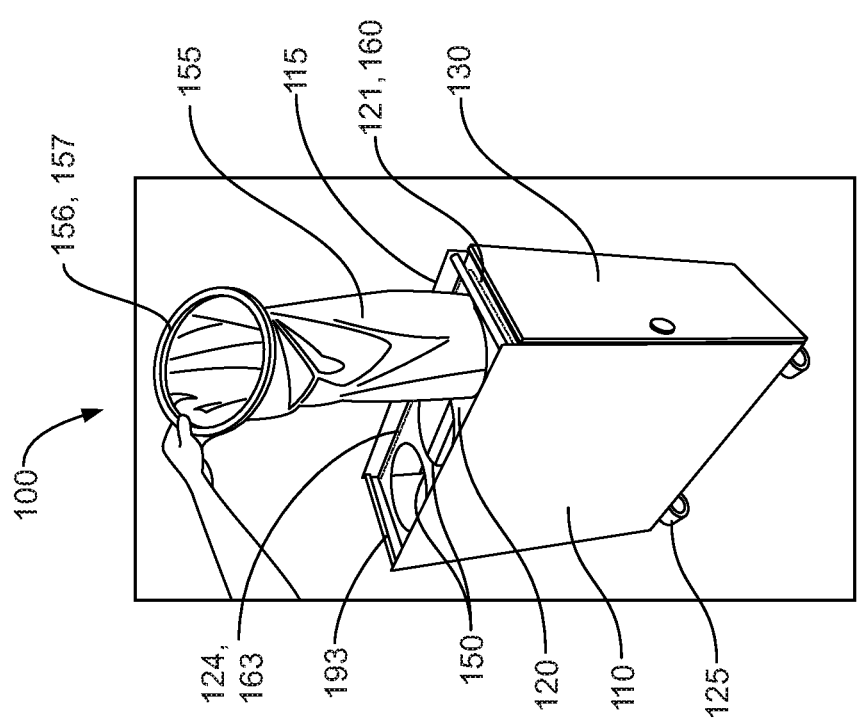
FIG. 6 is a diagrammatic representation of a perspective view of a cart apparatus, according to the embodiment of FIG. 1, transitioning from the service configuration to the waste collection configuration.

The cart apparatus 100 also includes at least one opening 150, and preferably a plurality of openings 150, defined in the top support 120. In one embodiment, shown in FIG. 5, there may be three openings 150 arranged in series and configured to receive containers 155, as shown in FIG. 6 and as discussed below. The arrangement having three openings 150 may beneficially aid in recycling by permitting trash sorting at the time of collection. In one embodiment, a first end 121 of the top support 120 may have a first channel 160, and a second end 122 of the top support 120 may have a second channel 161. A first side 123 of the top support 120 may optionally include a third channel 162 and a second side 124 of the top support 120 may have a fourth channel 163. These channels 160, 161, 162, 163 are best seen in FIG. 3 and may be formed as channels to receive liquid spills that may occur during food and beverage service or during waste collection and sorting. As such, the channels 160, 161, 162, 163 may prevent any spills from flowing into other areas of the cart apparatus 100. In a particular embodiment, shown in FIGS. 11-13, each of the openings 150 in the top support may be surrounded by a raised annular ring 153 or other barrier to prevent liquid spills from draining into the openings 150.

Figure 4:
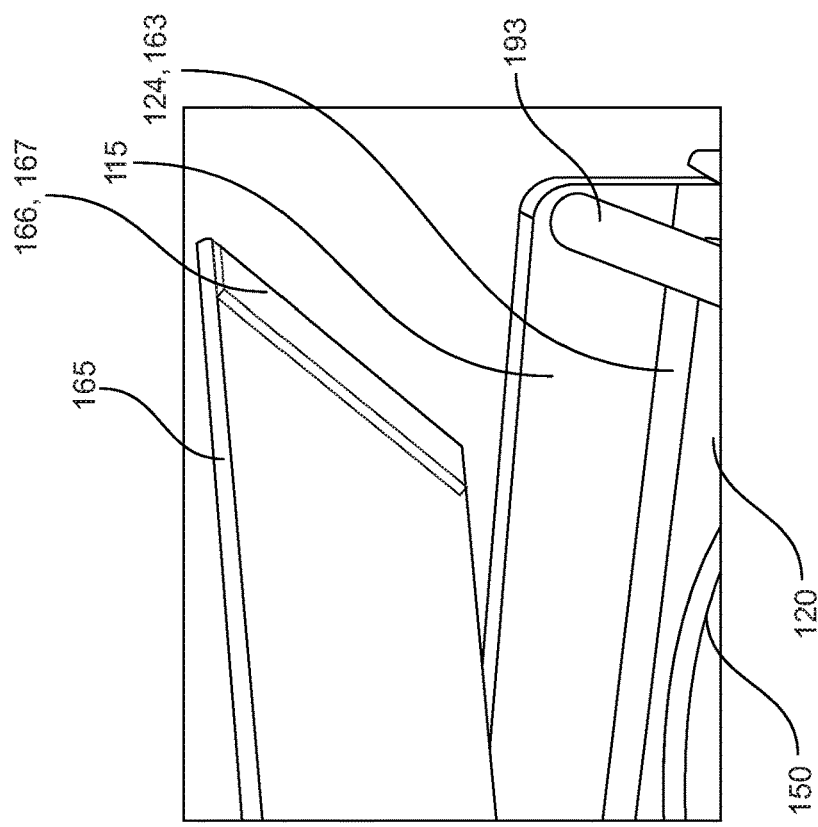
FIG. 4 is a diagrammatic representation of a partial perspective view of a cart apparatus, according to the embodiment of FIG. 1, transitioning from the service configuration to the waste collection configuration.

As shown in FIG. 1, when the cart apparatus 100 is in the service configuration, a lid 165 is removably coupled to the top support 120, thereby covering the plurality of openings 150. During food and beverage service, the lid 165 may be used to support service trays, food or beverages, for example, on the cart apparatus 100. After the food and beverage service, the cart apparatus 100 may be converted to a waste collection arrangement. The conversion may involve removing the lid 165 from the top support 120 by sliding or lifting the lid 165 off the cart apparatus 100, for example, as shown in FIGS. 2-4. The lid 165 may be stored separately from the cart apparatus 100 or placed on the base 105 inside the cart apparatus 100, for example. In one embodiment, the lid 165 may be made of aluminum and/or any suitable material, for example. As shown in FIG. 4, a first protuberance 166 may optionally be coupled to a first end 167 of the lid 165 and a second protuberance (not shown) may be coupled to a second end 168 of the lid 165. This configuration may permit the first protuberance 166 and the second protuberance to mate with the first channel 160 and the second channel 161, respectively, of the top support to prevent the lid 165 from shifting during food and beverage service and/or when the cart apparatus 100 is stowed, for example.

As shown in FIG. 6, the cart apparatus 100 further includes at least one container 155, and preferably a plurality of containers 155. In one embodiment, each container 155 may have a flange 156 at a first end 157. Each of the containers 155 is configured to be removably coupled to one of the plurality of openings 150 in the top support 120 via the flange 156. In one embodiment, the flange 156 may be a single continuous radial projection or may be a plurality of radial projections coupled to a collar (not shown). In the embodiment shown, the containers 155 may take the form of bag inserts. Specifically, the bag inserts may be collapsible for storage until use in the waste collection configuration. The bag inserts may also have the benefit of being lightweight. After the lid 165 has been removed from the top support 120, each of the containers 155 is inserted through a corresponding opening 150 in the top support 120 such that the flange 156 rests atop the top support 120 or the raised annular ring 153. The first end 157 of each container 155 is open to receive waste in the waste collection configuration and any waste may be covered by the lid 165 when the waste is subsequently stowed. In one embodiment, the containers 155, including the bag inserts embodiment, may be reusable.

In one optional embodiment, the containers 155, including the bag insert embodiment, may be non-expandable and may have a diameter smaller than a diameter of the openings 150 in the top support 120. This configuration of the container 155 may reduce or eliminate bulging and/or an increased diameter due to waste contained therein. As used herein, a bulge is a discrete protrusion, whereas an increased diameter applies to the entire perimeter. Reducing or eliminating bulging and/or an increased diameter may therefore facilitate removal of the container 155 and/or a bag 170 disposed therein, as discussed in more detail below, through the respective opening 150 in the top surface 120. The non-expandable nature of the container 155 may further aid in compaction of waste therein by maintaining the waste in the path of a compactor 190. In one embodiment, the container 155 may be made of fiberglass, graphite, or flame resistant fabric or film or combinations thereof. The flame resistant property of the containers 155 coupled with a non-flammable lid 165 may permit the cart apparatus 100 to be stowed on an aircraft with waste therein in compliance with FAA regulations.

Turning to FIGS. 7 and 8, the cart apparatus 100 may include at least one bag 170, and preferably a plurality of bags 170, disposed in one of the of containers 155. The bags 170 may be similar to a trash bag configuration. An open end 171 of the bag 170 may be secured between the flange 156 of the container 155 and a locking ring 175. In one embodiment, a plurality of locking rings 175 may be provided, each configured to be removably coupled to one of the flanges 156 of the plurality of containers 155. In one embodiment, the locking rings 175 may be configured to snap-fit with the flanges 156 or the locking rings 175 may have male or female connectors to mate with corresponding male or female features on the flanges 156. In one embodiment, the locking rings 175 may be color coded to aid in waste sorting by designating a bag for recyclable materials, a bag for waste containing liquid and a bag for dry waste, though other examples are contemplated. The bags 170 may also be color coded such that, upon removal, a color of a bag may indicate whether the bag contains trash or the bag contains materials for recycling.

Returning now to FIG. 1, the cart apparatus 100 also optionally includes at least one pair of shelf brackets 180 coupled to the first sidewall 110 and the second sidewall 115 opposite each other. In one embodiment, each shelf bracket 180 may have a vertical section 182 for securing to one of the first and second sidewalls 110, 115 and a horizontal section 183 extending towards the opposite sidewall from that which the shelf bracket 180 is coupled to. In one embodiment, each shelf bracket 180 may extend substantially along the entire length of the respective sidewall 110, 115 to which the shelf bracket 180 is coupled. In one embodiment, the horizontal section of each shelf bracket 180 extends from each sidewall a distance that is contemplated to permit clearance between the shelf bracket 180 and the container 155 when the cart apparatus 100 is in the waste collection configuration, shown in FIG. 8. In various embodiments, the shelf brackets 180 may be made of aluminum and may be about 0.10 inches (0.25 cm) thick, though other dimensions and materials are contemplated.

In one embodiment, the cart apparatus 100 may also include at least one tray 181 disposed on the pair of shelf brackets 180 such that the tray 181 rests on the horizontal sections of the pair of shelf brackets 180. This arrangement may permit the trays 181 to slide in and out of the cart apparatus 100 to restock food and beverages and to assist in food service, for example. In addition, the trays 181 may be removed from the shelf brackets 180 to stack the trays 181 on the base 105 of the cart apparatus 100, for example, in the waste collection configuration, as shown in FIG. 8. In one embodiment, in which the cart apparatus 100 is intended to contain beverages, at least five pairs of shelf brackets 180 may be provided with the horizontal sections of each pair spaced at least about 5.5 inches (13.97 cm) vertically apart from each other. In an optional embodiment in which the cart apparatus 100 is intended to contain food, at least eleven pairs of shelf brackets 180 may be provided with the horizontal sections of each pair spaced at least about 2.75 inches (6.98 cm) apart from each other. Other spacing arrangements and total pairs of shelf brackets 180 are contemplated. In an optional embodiment, one of the pairs of shelf brackets 180 may be replaced with an intermediate support 185, described below.

In one embodiment, shown in FIGS. 1 and 8, an intermediate support 185 may be coupled to the first sidewall 110 and the second sidewall 115 between the base 105 and the top support 120. This intermediate support 185 may define a plurality of openings 186 each being concentrically aligned with a respective opening 150 of the top support 120. In one embodiment, a tray 181 may be disposed upon the intermediate support 185 when the cart apparatus 100 is arranged in the service configuration. Intermediate support 185 may beneficially increase the structural integrity of the overall cart apparatus 100 by acting as an anchor between the first and second sidewalls 110, 115. The intermediate support 185 may also advantageously reduce movement of the respective containers 155 disposed through the openings 186 of the intermediate support 185 during waste compaction, for example, discussed in more detail below.

In one embodiment, depicted in FIG. 9, a compactor 190 may be provided for use with the cart apparatus 100. The compactor 190 includes a push rod 191 coupled at one end to a disc 192. In operation, the disc 192 may be inserted through one of the openings 150 in the top support 120 and forced downward within the container 155 and bag 170 thereby compressing and compacting any waste therein. In an optional embodiment, shown in FIG. 10, the cart apparatus 100 may include a handrail 193 coupled to the first sidewall 110 and the second sidewall 115. In this embodiment, a lever arm 194 may be movably coupled to the push rod 191 and rotatably coupled to the handrail 193. Alternatively, the lever arm 194 may be coupled to another anchor point about which the lever arm 194 may pivot or rotate, and a series of ratchet teeth 195 may be arranged along at least a portion of the length of the push rod 191 to facilitate translation of a force applied to the lever arm 194 to the push rod 191.

Figure 12:
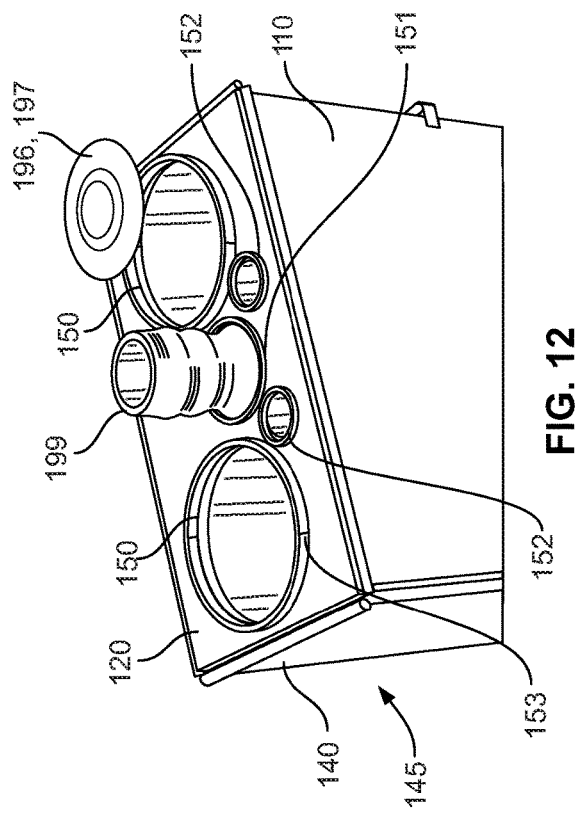
FIG. 12 is a diagrammatic representation of a perspective view of a cart apparatus, including at least one liquid absorber.
Figure 11:
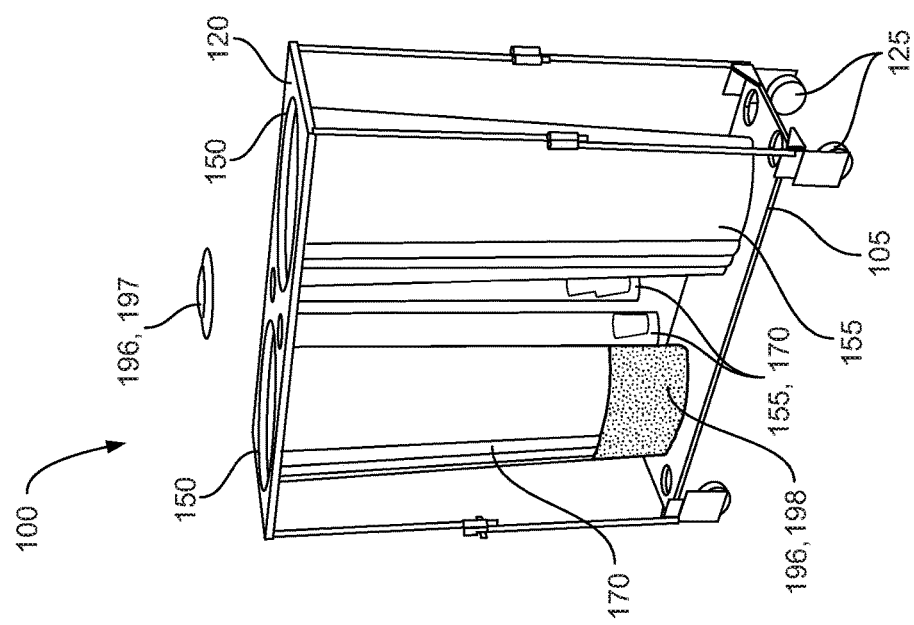
FIG. 11 is a diagrammatic representation of a perspective view of a cart apparatus including at least one liquid absorber.

In a particular embodiment, the cart apparatus 100 may include at least one liquid absorber 196, shown for example in FIGS. 11 and 12, configured to be disposed in one of the plurality of bags 170. In one embodiment, the liquid absorber 196 may have the form of a pad 197 or a liner 198 in the bottom of the bag 170, where liquid tends to flow. The pad 197 or liner 198 may be provided in a unitary fashion with a bag 170 or may be a standalone insert. In a further embodiment, the liquid absorber 196 may include sodium polyacrylate, sodium tripolyphosphate, cellulose, sodium phosphate or combinations thereof. In one embodiment, the liquid absorber 196 may be configured to absorb at least 10 cups (2.36 L) of liquid. In one embodiment, the liner 198 may weigh 24 grams, may have a thickness of about 0.1 mm and may be positioned on the bottom 2 square feet (0.6 square meters) of a given bag. In various embodiments, the liquid absorber 196 may absorb up to 50 to 100 times its own weight in liquid, which may reduce the risk of leakage that may result from a puncture during compaction or as a result of spills during waste collection. The liquid absorber 196 may also have the advantage of reducing the need to double bag trash bags with liquid in them and may reduce cabin cleaning time. Still further, the liquid absorber 196 may improve structural resilience of the bags 170 and may reduce trash bag distortion due to waste compaction, for example.

Figure 13:
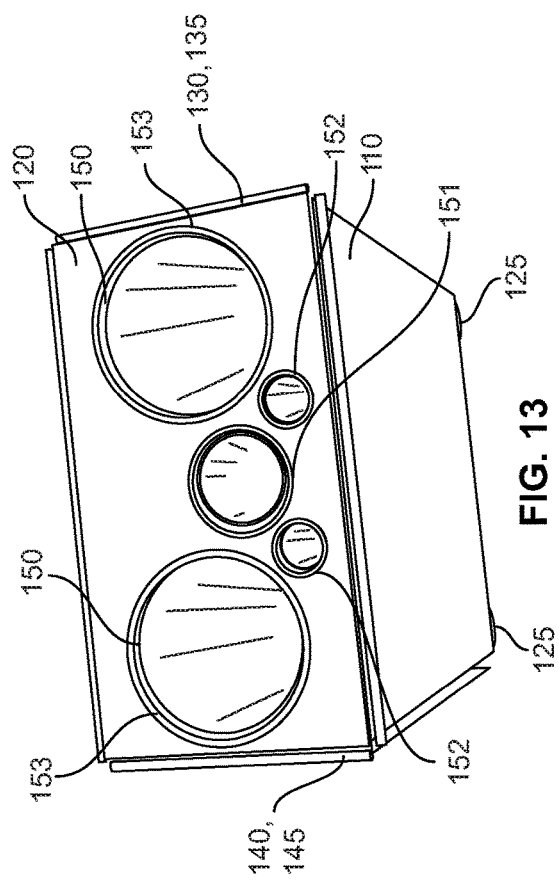
FIG. 13 is a diagrammatic representation of a perspective view of a cart apparatus, according to the embodiment of FIG. 12.

In a further embodiment illustrated in FIGS. 11-13, the plurality of openings 150 of the top support 120 may include two openings 150 configured to receive a container 155 and bag 170 for waste as discussed above. A bag insert is omitted in one of the openings 150 of FIG. 11 in order to show the inner bag 170 and a liquid absorber 196 in the form of a liner 198. The top support 120 may also include an opening 151 configured to be coupled to a liquid stowage bin (not shown) that in turn is configured to receive a liquid absorber liner 199 that may optional have a tubular shape. In operation, liquid would be poured through the opening 151 into the liquid stowage bin and substantially absorbed by the liquid absorber 199. And the top support 120 may include two openings 152 configured to receive a bag 170 or a container 155 sized and shaped to receive passenger cups in a stackable manner, for example, that may have been previously emptied into the liquid stowage bin.

Figure 14:
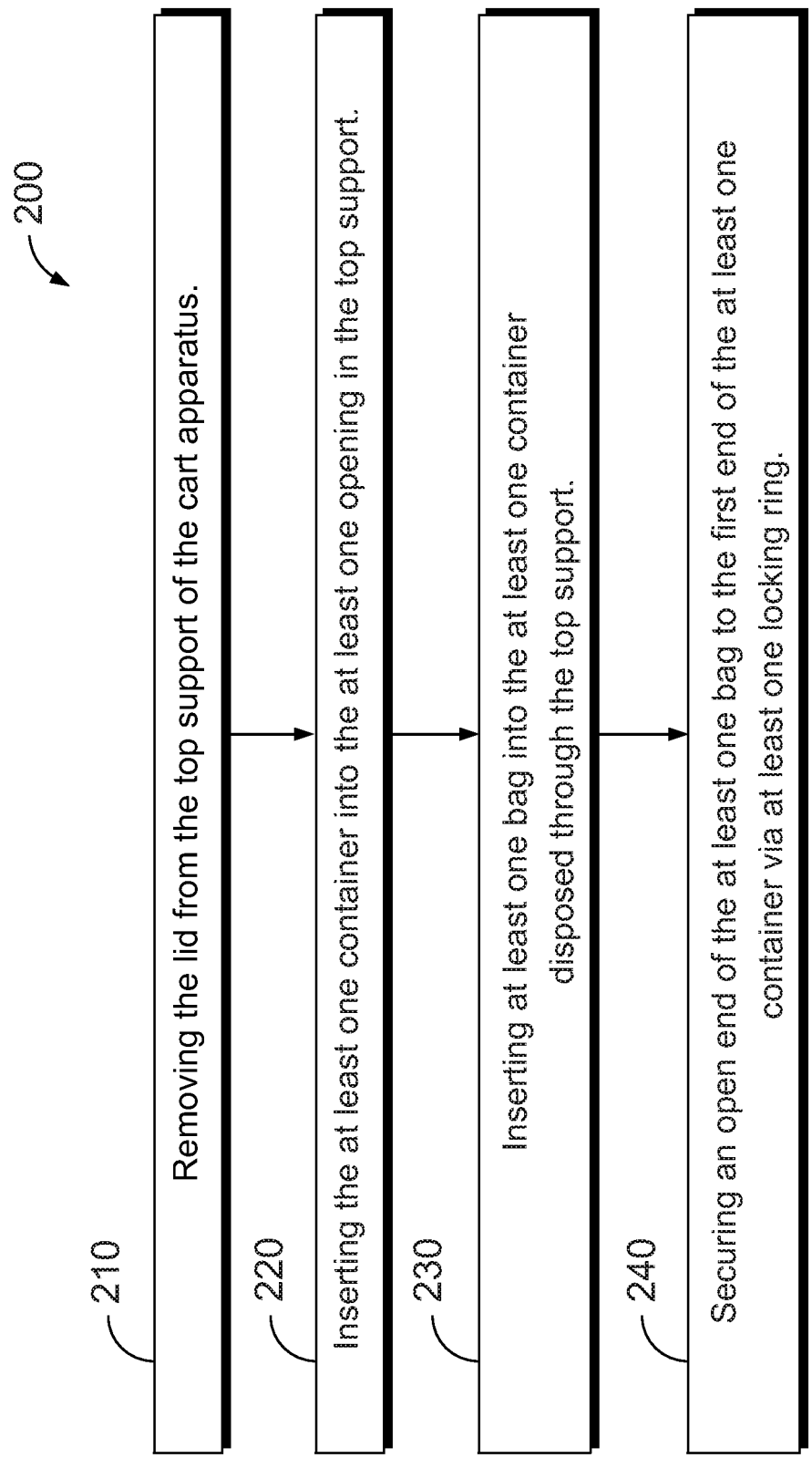
FIG. 14 is a flow diagram of a method for converting a cart apparatus from a service configuration into a waste collection configuration, according to one example embodiment.

FIG. 14 illustrates a method for using the cart apparatus 100 shown in FIGS. 1-13. In operation, the cart apparatus 100 may typically be arranged in a service configuration during take-off and through food and/or beverage service. After food and beverage service, the cart apparatus 100 may be converted to the waste collection configuration to collect, sort, compact and stow waste. Referring now to FIGS. 1 and 14, method 200 includes, at block 210, removing the lid 165 from the top support 120 to facilitate the conversion to the waste collection configuration. As noted above with respect to the cart apparatus 100, the lid 165 may be removed by sliding the lid 165 along the top support 120 or by lifting the lid 165 from the top support 120. The lid 165 may be stored separately or placed inside the cart apparatus 100 on top of the base 105, for example.

At block 220, each of the plurality of containers 155 is inserted into one of the plurality of openings 150 in the top support 120. And at block 230, each of a plurality of bags 170 is inserted into one of the containers 155 defined through the top support 120. At block 240, an open end of the at least one bag 170 is secured to the first end 157 of the at least one container 155 via at least one locking ring 175. In one embodiment, the locking ring 175 may snap-fit with the flange 156 of the container 155.

In one embodiment, the method 200 may include removing a plurality of trays 181 from the plurality of shelf brackets 180 and stacking the plurality of trays 181 on the base 105. The trays 181 may be used in the service configuration to hold food and/or beverages and self-contained within the cart apparatus 100 in the waste collection configuration.

In an optional embodiment, the method 200 may include inserting at least one liquid absorber 196 in at least one bag 170. This liquid absorber 196 may have the form of a pad 197 or a standalone liner 198 to reduce the risk of liquids leaking from the bags 170 or from the containers 155.

In a further embodiment, the method 200 may include inserting a disc 192 of a compactor 190 into one of the containers 155. The compactor 190 includes a push rod 191 coupled at one end to the disc 192, and a user may apply a downward force to the push rod 191, thereby compacting any contents therein. The force may be applied directly to the push rod 191 by the user or by way of a lever arm 194 in conjunction with ratchet teeth 195 disposed along a portion of the push rod 191, as described above.

In an additional embodiment, the method 200 may include replacing the lid 165 on the top support 120 and stowing the cart apparatus 100 in a wall of an aircraft, for example. In various embodiments, in which the containers 155 and the lid 165 are made of fire resistant materials, the arrangement of the lid 165 being returned to the top support may have the benefit of fully enclosing the containers 155, thus permitting storage of waste in the cart apparatus when in a stowed position within the aircraft.

Embodiments of the disclosure may find use in a variety of potential applications, particularly in the transportation industry, including for example, aerospace, trains, marine, automotive (e.g., bus coaches) applications and other applications where the food and beverages are served and waste storage may be used.

It is intended that the foregoing detailed description be regarded as illustrative rather than limiting and that it is understood that the following claims, including all equivalents, are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An apparatus comprising:
a base;
a first sidewall and a second sidewall each coupled to the base;
a top support coupled to the first sidewall and the second sidewall;
a first opening, a second opening and a third opening each defined in the top support;
a first container removably coupled to the first opening, the first container being non-expandable and having a diameter smaller than a diameter of the first opening;
a second container removably coupled to the second opening, the second container sized and shaped to receive a plurality of cups in a stackable arrangement;
a liquid stowage bin coupled to the third opening;
an intermediate support coupled to the first sidewall and the second sidewall between the base and the top support, wherein the intermediate support defines at least one opening concentrically aligned with the first opening of the top support such that the first container is disposed through the at least one opening of the intermediate support;
a plurality of trays stacked on the base beneath the first container, the second container and the liquid stowage bin; and
a plurality of pairs of shelf brackets, wherein each pair of the plurality of pairs of shelf brackets is coupled to the first sidewall and the second sidewall opposite each other between the base and the top support, and wherein each pair of the plurality of pairs of shelf brackets is configured for one of the plurality of trays to be disposed on horizontal sections of each pair of the plurality of pairs of shelf brackets, when the first container is removed from the first opening and the second container is removed from the second opening.

2. The apparatus of claim 1, further comprising:
a liquid absorber disposed in the liquid stowage bin.

3. The apparatus of claim 2, wherein the liquid absorber is in a form of a liner.

4. The apparatus of claim 2, wherein the liquid absorber has a tubular shape.

5. The apparatus of claim 1, further comprising:
a bag disposed in the first container.

6. The apparatus of claim 5, further comprising:
a second liquid absorber disposed in a bottom of the bag, the second liquid absorber having a form of a pad or a liner.

7. The apparatus of claim 6, further comprising:
a raised annular ring surrounding the first opening.

8. A method for assembling a cart apparatus including (a) a base, (b) a first sidewall and a second sidewall each coupled to the base, (c) a top support coupled to the first sidewall and the second sidewall, (d) a first opening, a second opening and a third opening each defined in the top support; (e) a first container removably coupled to the first opening, the first container being non-expandable and having a diameter smaller than a diameter of the first opening; (f) a second container removably coupled to the second opening, the second container sized and shaped to receive a plurality of cups in a stackable arrangement; (g) a liquid stowage bin coupled to the third opening, (h) an intermediate support, coupled to the first sidewall and the second sidewall between the base and the top support, wherein the intermediate support defines at least one opening concentrically aligned with the first opening of the top support such that the first container is disposed through the at least one opening of the intermediate support; (i) a plurality of trays stacked on the base beneath the first container, the second container and the liquid stowage bin; and (j) a plurality of pairs of shelf brackets, wherein each pair of the plurality of pairs of shelf brackets is coupled to the first sidewall and the second sidewall opposite each other between the base and the top support, and wherein each pair of the plurality of pairs of shelf brackets is configured for one of the plurality of trays to be disposed on horizontal sections of each pair of the plurality of pairs of shelf brackets, when the first container is removed from the first opening and the second container is removed from the second opening, the method comprising:

inserting the first container into the first opening in the top support;

inserting a bag into the first container disposed through the top support; and securing an open end of the bag to a first end of the first container via at least one locking ring.

9. The method of claim 8, further comprising:
inserting the second container into the second opening in the top support.

10. The method of claim 8, further comprising:
inserting a liquid absorber in the liquid stowage bin.

11. The method of claim 8, wherein the cart apparatus further comprises a lid, the method further comprising:
prior to inserting the first container into the first opening, removing the lid from the top support; and
placing the lid on the base.

12. The method of claim 8, wherein at least one tray of the plurality of trays is disposed on at least one pair of shelf brackets of the plurality of pairs of shelf brackets, the method further comprising:
prior to inserting the first container into the first opening, removing the at least one tray from the at least one pair of shelf brackets; and
placing the at least one tray on the base.

13. A method for collecting waste using a cart apparatus including (a) a base, (b) a first sidewall and a second sidewall each coupled to the base, (c) a top support coupled to the first sidewall and the second sidewall, (d) a first opening, a second opening and a third opening each defined in the top support; (e) a first container removably coupled to the first opening, the first container being non-expandable and having a diameter smaller than a diameter of the first opening; (f) a second container removably coupled to the second opening, the second container sized and shaped to receive a plurality of cups in a stackable arrangement; (g) a liquid stowage bin coupled to the third opening, (h) an intermediate support coupled to the first sidewall and the second sidewall between the base and the top support, wherein the intermediate support defines at least one opening concentrically aligned with the first opening of the top support such that the first container is disposed through the at least one opening of the intermediate support; (i) a plurality of trays stacked on the base beneath the first container, the second container and the liquid stowage bin; and (j) a plurality of pairs of shelf brackets, wherein each pair of the plurality of pairs of shelf brackets is coupled to the first sidewall and the second sidewall opposite each other between the base and the top support, and wherein each pair of the plurality of pairs of shelf brackets is configured for one of the plurality of trays to be disposed on horizontal sections of each pair of the plurality of pairs of shelf brackets, when the first container is removed from the first opening and the second container is removed from the second opening, the method comprising:

collecting waste in the first container;

emptying a liquid from a cup into the liquid stowage bin; and placing the cup in the second container.

14. The method of claim 13, further comprising:
emptying liquid from a plurality of cups into the liquid stowage bin; and
stacking the plurality of cups in the second container.

15. The method of claim 13, further comprising:
inserting a disc of a compactor into the first container, wherein the compactor comprises a push rod coupled at one end to the disc; and
applying a downward force to the push rod, thereby compacting waste within the first container.

16. The method of claim 15, further comprising:
after compacting waste within the first container, collecting additional waste in the first container.

17. The method of claim 13, wherein the cart apparatus further comprises a fourth opening defined in the top support and a third container removably coupled to the fourth opening, the third container being non-expandable and having a diameter smaller than a diameter of the fourth opening, the method further comprising:
collecting recyclable materials in the third container.

18. The method of claim 17, further comprising:
prior to collecting waste in the first container, inserting a first bag into the first container; and
prior to collecting recyclable materials in the third container, inserting a second bag into the third container, wherein the second bag has a different color than the first bag to indicate that the second bag contains recyclable materials upon removal of the second bag from the third container.

19. The method of claim 13, the cart apparatus further comprising a liquid absorber liner disposed in the liquid stowage bin, the method further comprising:
the liquid absorber liner absorbing the liquid from the cup emptied into the liquid stowage bin.

20. The method of claim 13, wherein the cart apparatus further comprises a lid, the method further comprising:
removing the lid from the base;
placing the lid on the top support; and
stowing the cart apparatus in an aircraft.

* * * * *